Nov. 25, 1952 P. P. ZAPPONI 2,619,454

METHOD OF MANUFACTURING A MAGNETIC RECORDING MEDIUM BY ELECTRODEPOSITION

Filed Aug. 30, 1945 2 SHEETS—SHEET 1

INVENTOR.
PASCHAL P. ZAPPONI
BY Pinelles & Greene
ATTORNEYS

INVENTOR.
PASCHAL P. ZAPPONI
BY Pinelles & Greene
ATTORNEYS

Patented Nov. 25, 1952 2,619,454

UNITED STATES PATENT OFFICE 2,619,454

METHOD OF MANUFACTURING A MAGNETIC RECORDING MEDIUM BY ELECTRODEPOSITION

Paschal P. Zapponi, Cleveland, Ohio, assignor to The Brush Development Company, Cleveland, Ohio, a corporation of Ohio Application August 30, 1945, Serial No. 613,645

2 Claims. (Cl. 204—43)

This invention relates to magnetic recording and reproducing systems of the type using a reelable, thin, flexible magnetic record track held in coiled form on revolvably mounted reels and reeled from one reel on the other for recording or reproducing magnetic signals by magnetic flux interlinkage between a magnetic signal transducer head and an element of the record track moving past the pole piece gap of the transducer head.

Among the objects of the invention is a novel reelable, thin, flexible plated magnetic record track for such recording systems, and novel methods of manufacturing such magnetic record tracks.

The foregoing and other objects of the invention will be best understood from the following description of exemplifications thereof, reference being had to the accompanying drawing wherein Fig. 1 is a diagram illustrating a manufacturing system of the type suitable for manufacturing a magnetic record track exemplifying the invention;

Figures 1, 2, 3:
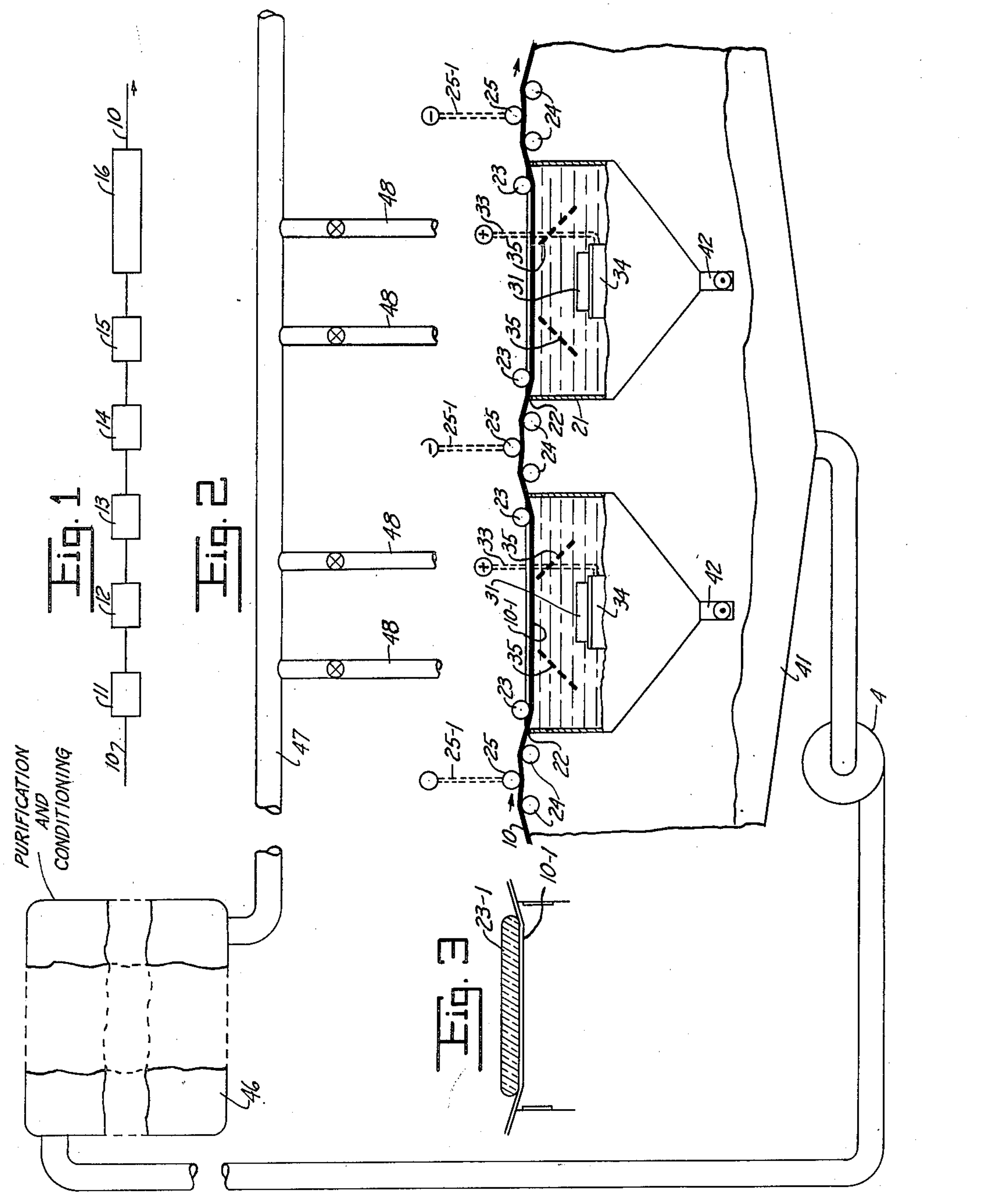
Fig. 2 is a diagrammatic view of the principal elements of the plating equipment used for plating a magnetic record track in accordance with the principles of the invention.
Fig. 3 is a view similar to Fig. 2 of portions of a plating vessel and a modified form of guide member for such plating vessel.

It is well known that in magnetic recording systems in which electric signals are recorded on a magnetic recording medium and played back therefrom, it is essential that the magnetic recording medium should exhibit a high coercive force and that the thickness should be very thin. For this reason, many practical prior magnetic recording systems used as a magnetic recording medium either a very thin magnetic steel wire or a very thin magnetic steel tape. Since a great length of round thin steel wire can be stored on a small reel, it was used in all applications where a long recording period was required.

In order to be commercially satisfactory, the magnetic material of the recording medium has to be able to magnetically record and to reproduce the magnetically recorded signals with a signal-to-noise ratio of at least about 25 decibels, and in case of high quality recording systems, with a signal-to-noise ratio of the order of about 30 decibels or more.

As used herein, the term "signal-to-noise ratio" is the ratio of the level of the reproduced signal to the noise level when equalized over the desired frequency band, and recording with D. C. bias with the recording medium moving at a speed of the order of five feet per second or less.

The commercially available drawn or rolled thin magnetic steel wires or tapes have a coercive force in the range between about 25 to 50 oersted and a remanence between about 3,000 and 10,000 gauss.

In order to record with a satisfactory signal-to-noise ratio, the magnetic material of the recording medium must be highly uniform in its structure and it must have a very smooth exterior surface.

For best results, it is desirable to confine the magnetic recording process to a very thin magnetic record layer. Alloys and materials of high coercive force which are used for making the commercially available thin magnetic recording wires and tapes are very hard and difficult to roll and draw, and most of them require careful heat treatment. Since only a thin layer of the magnetic material of such available magnetic recording media is required for carrying on the magnetic process, the balance of the expensive magnetic recording material is wasted.

Because of the difficulties and expenses connected with the manufacture of thin steel wires and tapes exhibiting characteristics required for a good magnetic recording medium, the idea of providing a magnetic recording medium by plating a non-magnetic wire with a thin layer of magnetic material has been advanced again and again following the first suggestion of such electroplated recording medium, given in the Pederson Patent 836,339, filed in 1901.

When a thin reelable magnetic steel wire is used as a recording medium in a magnetic recording system, the amplitude of the playback voltage at high frequency signals depends on the position of the wire relative to the pole piece portions bordering the magnetic gap of the magnetic transducer head. This is due to the fact that in recording a high frequency signal on a wire, the magnetic change in the wire is confined to a relatively small area region of the wire on the side which is in positive engagement with the pole faces of the magnetic record transducing head, a higher playback level being obtained from the side of the wire which was in good engagement with the pole faces than from the other side of the wire.

Since it is practically impossible to prevent twisting of the wire when it is reeled from one reel to the other past the magnetic head, the variations of the pick-up level caused by differences in positions of the wire surface relative to the pole faces of the magnetic transducer head result in distortion of the output. For this reason, high quality magnetic recording systems resorted to flat tapes as a recording medium, although, as stated before, a thin magnetic wire is more desirable because a great length of it can be stored on a small reel.

Prior to the invention, there was not commercially available any flexible electroplated magnetic recording medium which could be used in lieu of the commercially available magnetic steel wire or tape. This is probably due to the fact that prior electroplated layers of magnetic material, such as iron, nickel and cobalt which exhibit a high coercive force could retain magnetic orientation only when the electroplated magnetic layer was deposited on relatively rigid bases and that the magnetic properties important for its usefulness as a magnetic recording medium deteriorate under the flexing to which the flexible recording medium has to be subjected in reeling it from one reel to another.

The present invention provides a flexible round or flat magnetic recording medium which can be reeled for an indefinite length of time from one reel to the other past a magnetic transducing head for recording magnetic signals and reproducing the recorded signals. Such recording medium of the invention is generally formed of a flexible round or tape-like core or base of non-magnetic ductile metal which may be readily drawn and rolled, and which has a grain structure oriented in the direction of its length and a thin magnetic layer having a thickness in the range between about .0002 and .0008 inch of one or more ferro-magnetic metals of the group of metals including cobalt, nickel, or alloys thereof, united by electrodeposition to at least one side of the core and exhibiting a coercive force on the order of about 100 oersted or more, a remanence in the range of 2,000 gauss or more, and a surface of high smoothness that magnetic signals recorded thereon with direct current bias are reproduced with a signal-to-noise ratio of at least about 30 decibels over the frequency range up to about 4,000 cycles per second.

For applications in which thin flexible magnetic steel wires have been used, a reelable thin filamentary, wire-like tape magnetic recording medium, which can be flexed in the direction of its plane and level wound on the reels and which has all the desirable characteristics of such thin steel wires, may be made by using as a base a narrow, drawn and/or rolled, wire-like tape of a ductile non-magnetic metal, such as copper, brass, Phosphor bronze, beryllium copper or the like, which is about one to two mils thick and about ten to thirty mils wide, to which a magnetic layer having a thickness of about .0002 to .0006 inch has been adherently united by an electroplating process of the invention, as described hereinafter.

As used herein, the term "non-magnetic materials" includes also para-magnetic materials, that is materials which have a magnetic permeability or mu greater than unity, but which exhibit no hysteresis loop characteristics and have no coercive force.

To make such wire-like tape with an electroplated magnetic layer of cobalt and nickel having the desired magnetic recording characteristics, the following plating solution or bath containing 50 grams of cobalt and 50 grams of nickel per litre of solution may satisfactorily be used:

Plating bath A:

| | | |
|---|---|---|
| $CoCl_2.6H_2O$ | grams/litre | 200 |
| $NiCl_2.6H_2O$ | grams/litre | 200 |
| $H_3BO_3$ | grams/litre | 25 |

The balance of the solution is water.

One or more cobalt-nickel anodes are held immersed in the bath. The tape which is being plated is the cathode.

Plating bath A-2:

| | | |
|---|---|---|
| $CoCl_2.6H_2O$ | grams/litre | 300 |
| $NiCl_2.6H_2O$ | grams/litre | 300 |
| $H_3BO_3$ | grams/litre | 40 |

Plating bath A-3:

| | | |
|---|---|---|
| $CoCl_2.6H_2O$ | grams/litre | 190 |
| $NiCl_2.6H_2O$ | grams/litre | 175 |
| $H_3BO_3$ | grams/litre | 25 |

Plating bath A-4:

| | | |
|---|---|---|
| $CoCl_2.6H_2O$ | grams/litre | 125 |
| $NiCl_2.6H_2O$ | grams/litre | 275 |
| $H_3BO_3$ | grams/litre | 25 |

Plating bath A-5:

| | | |
|---|---|---|
| $CoCl_2.6H_2O$ | grams/litre | 39 |
| $NiCl_2.6H_2O$ | grams/litre | 40 |
| $H_3BO_3$ | grams/litre | 25 |

In general, the salt concentration can be varied between 100 gr. and 600 gr. per litre, and the ratio of cobalt to nickel in the solution can be varied between 2.75/1.25 to 1.25/2.75—and as long as these ranges are used no critical difficulties will be encountered in producing a satisfactory magnetic recording medium.

The salt concentration in the solution is about four times the metal ion concentration in the solution, as can be determined by comparing the molecular weight of the solution with that of the metal ion. For example, the molecular weight of $CoCl_2.6H_2O$ is 238 and that of the cobalt ion is 59.

Before subjecting such wire-like tape base to the plating process of the invention, it is first subjected to a cleaning process in the manner indicated in the diagram of Fig. 1. The wire-like tape base 10 is passed in succession through a polisher unit 11, a degreaser unit 12, a chemical cleaner unit 13, a hot water bath 14, a cold water bath 15, and therefrom through the plating bath system 16.

In the polishing unit, the tape base 10 passing therethrough is subjected to a polishing action which imparts to the surface of the base the required high degree of smoothness to assure that the plating layer deposited thereon by the electroplating process of the invention likewise exhibits the required high degree of surface smoothness. An emery cloth of 600-mesh has been found to be effective in polishing the surface of the tape base to the required degree of smoothness. A Meehanite ground and polished wheel rotated at high speeds of about 1800 to 3000 R. P. M. is preferable as a polishing medium.

In the degreaser 12, the tape is subjected to the action of a vapor degreaser, such as trichlorethylene vapor. In the chemical cleaner unit 13, the base is subjected to a cleaning bath, for instance, one formed of a 10% solution of hot potassium hydroxide, with an addition of 3% potassium cyanide, the potassium cyanide serving as an etching agent to remove corroded material. The cleaning process is finished with a hot and cold water rinse in the hot water and cold water bath units 14, 15, before the tape base 10 is passed through the plating bath 16.

Fig. 2 illustrates diagrammatically one form of a plating bath system by means of which the process of electro-depositing on a wire-like tape base of ductile metal, such as Phosphor bronze, a thin magnetic record track layer may be carried on a commercial basis in accordance with the principles of the invention.

The plating system of Fig. 2 comprises a series of plating bath vessels 21, each shown maintained by end edges 22 of the vessel 21 which serve as a weir, filled with a plating solution bath up to a suitable level. The wire-like tape base 10 is guided, for instance, in the direction from left to right through the successive plating baths 22 of the series of plating vessels 21.

As indicated in Fig. 2, each plating vessel 21 is provided with guide means comprising two elongated inner guide members 23 suitably held at the inlet and exit sides of the vessel so as to maintain a length 10—1 of the moving tape-like base at a proper level within the plating solution, two additional elongated guide members 24, 25 suitably held at a higher level than the immersed guide members 23, serving to guide the moving tape base 10 towards and away from its level in the plating bath. The inner guide members 23 are formed of electrically non-conductive inert material, such as glass or ceramic material, which is not affected by the electro-chemical actions throughout the range of the operating temperature of the bath.

The outer guide members 24 serve also as polishing members. The guide members 25 are shown formed of revolvably mounted electrically conducting guide and contact members and serve to establish a good current-carrying contact connection with each of the successive elements 10—1 of the elongated base 10 as it moves through the successive vessels 21. Suitably insulated electrical conductors, indicated by dash lines at 25—1, connect the outer guide and contact members 25 to the negative terminal of the current supply source indicated by the (−) sign.

Within each of the plating vessels 21 there is also placed an anode aggregate 31 held in its proper operating position within the vessel by a support 32. Each anode aggregate 31 is shown connected to the positive terminal of a current supply source indicated by a (+) sign through an insulated supply conductor 33 and an insulated terminal member 34 which is in good contact engagement with the anode aggregate and is insulated by a suitable stop-off lacquer or compound, so that only the metallic elements of each anode aggregate 31 are exposed to the plating bath.

When depositing by the electro-plating process an electroplated magnetic record layer formed of a plurality of different ferro-magnetic metals, for instance, cobalt and nickel, as described herein, the anode aggregate 31 is formed either of an alloy of cobalt and nickel or of a plurality of blocks or bars of cobalt and nickel. When depositing an electroplated magnetic record layer of only one of the ferro-magnetic metals, for instance, of cobalt only, the anode aggregate 31 is formed of a block or bar of cobalt.

The exposed surfaces of the anode aggregate 31 and its location within the bath in relation to the level along which the plated length 10—1 of the base passes through the plating bath, are so shaped and chosen, and the resistance of the plating current path through the plating bath is so controlled, as to assure that, notwithstanding the resistive voltage drop accompanying the flow of plating current through the length of each tape base element 10—1 passing through the bath, substantially uniform current density is maintained along substantially the entire length of each tape base element 10—1 passing through the plating bath.

In other words, the resistance of the plating current path through the plating solution, between the exposed surface of the anode aggregate 31 and the surface of the tape base element 10—1 passing through the plating bath, is so controlled as to compensate for the resistive voltage drop accompanying the flow of the plating current through the length of the tape element 10—1 passing through a plating bath. This factor is important particularly in a case where the plated tape base is formed of a narrow wire-like tape of a material having relatively high resistance, such as Phosphor bronze.

Thus, wire-like tape of a commercial grade of Phosphor bronze, which is about .015″ wide, and about .002″ thick, has a resistance of about 2.3 ohms/foot at 25° C. To compensate for the resulting resistive voltage drop accompanying the flow of plating current through the length 10—1 of such tape base immersed in the plating bath, provision is made to provide for a corresponding compensating increase of the resistive drop along the plating current path through the electrolyte along which the plating current flows between the exposed surfaces of the anode aggregate 31 and the immersed tape element 10—1.

As indicated in Fig. 2, according to the invention, suitable barrier members 35 are placed across the plating current paths through the plating bath extending between the anode aggregate 31 and the tape element 10—1 passing therethrough, and the barriers 35 are provided with openings of such size and so distributed as to increase the resistance of the electrolyte path between the anode aggregate 31 and the elements of the tape portion 10—1 passing through the bath which are of higher potential due to the resistive voltage drop of the plating current passing therethrough and to substantially equalize the plating current distribution along substantially the entire length of the tape portion 10—1 passing through the bath. The barriers 35 may be made of perforated plates or arrays of rods or screens of a ceramic material, such as glass or other materials, which is not affected by the electrolytic action and temperature of the plating bath.

In depositing magnetic record track layers of cobalt and nickel on a tape base by the process of the invention described above and carrying on the plating process with a current density of about 100 amperes D. C. per square foot of plating surface area, a plated magnetic layer of about .0003″ thick is obtained in a plating time of about 3.5 to 4 minutes.

With a plating system of the type shown in Fig. 1, the plating can be carried on on an efficient basis by moving the tape base 10 through the plating bath through a succession of plating vessels 21, first in one direction, then in opposite direction, along successive parallel paths, until each element of the moving tape base 10 has been subjected to plating operation of the required duration. Each plating vessel 21 has sufficient length in a direction transverse to the direction of the motion of the tape elements 10—1 to provide for plating therein the required number of tape elements moving parallel to each other through the same plating bath. Suitable constructions, not shown, mounted adjacent, or forming part of the guide rods 24, keep the adjacently moving strands of the tape 10 separated from each other.

When it is desired to assure that each flat side of the tape base is uniformly plated, the tape base is passed through the successive baths in one direction with one face directed toward the anode and then passed through the baths in reverse direction with the other face of the tape facing the anode.

One phase of the invention involves the provision of an electroplated flexible tape-like recording medium formed of a non-magnetic base or core, one side of which has united thereto a plated magnetic record track layer of the thickness required for operation as a good magnetic recording medium, while the other face of the tape has no plating or only an extremely thin plating, for instance, of the order of .0001″ or less.

The plating system of Fig. 2 may be utilized for providing a magnetic recording medium such as a tape base of non-magnetic metal having a plated magnetic recording layer united to one side of the tape base only. To this end, the tape base 10 is passed through the plating bath of each plating vessel 21 with the same face of the tape always facing in the direction of the anode, while maintaining the level at which each tape section 10—1 moves through the plating bath adjacent the upper level 22 of the plating bath, so that only one face of the tape is effectively exposed to the plating action of the plating bath. Alternatively, one side of the tape may be shielded with a stop-off lacquer.

In carrying on such plating process for plating only one side of a moving tape base 10, the level of the electrolyte in each plating vessel 21 may be at all times maintained at a predetermined overflow level, for instance, determined by an upper edge region of the plating vessel over which the electrolyte overflows into a collecting vessel 41; and passing the moving tape so that it moves with its downwardly facing flat side along the upper level of the plating bath of the vessel.

Alternatively, as shown in Fig. 3, each vessel may be provided with an extended inner guide member 23—1 overlying the entire length 10—1 of the tape base passing through the electrolyte bath of the plating vessel 21 so that only one side of the tape base 10—1 passing through the plating bath is exposed to the electrolyte for electro-depositing thereon the desired layer of magnetic material, while the other flat side of the moving tape 10 is protected by its engagement with the guide member 23—1 against the action of the electrolyte bath. Plating with one side of the tape base shielded, the thickness of the plating on the shielded side will be only about 10% of the other plating, and the thin plating layer may be easily removed by polishing it.

Figure 4:
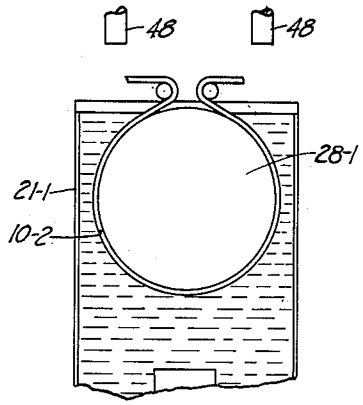
Figs. 4 and 5 are views similar to Fig. 3 of modified forms of the plating vessel and the associated elements.

As indicated in Fig. 4, a plating vessel 21—1 may be provided with an inner guide member 28—1 having an extended curved guide surface, for instance, a cylindrical guide surface, as shown, and mounted so that it is free to revolve within the bath for guiding therethrough a length 10—2 of a tape base 10 in a manner analogous to that described in connection with Figs. 2 and 3, so that only one side of the tape base passing through the bath in the vessel is exposed to the plating action of the bath.

Figure 5:
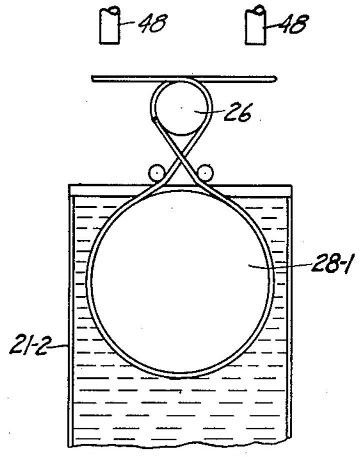

As indicated in Fig. 5, a plating vessel 21—2 provided with such revolvably mounted cylindrical inner guide roller 23—1 substantially immersed in the electrolyte filling the vessel, may be combined with an external revolvably mounted guide roller 26 so that successive sections of a moving tape-like base 10 may be looped around the inner guide roller 28—1 and the outer guide roller 26 in the form of a continuous succession of generally 8-shaped loops, so that the lower loop portion of each of the consecutive 8-shaped loop sections of the moving tape is guided along the immersed cylindrical surface of the inner guide roller 23—1 through the plating bath until a plating of the required thickness has been deposited on each element of the tape base 10 moving through the plating bath of the single vessel 21—2.

As in the system described in connection with Fig. 2, a vessel, such as vessel 21—2 of Fig. 5, provided with a cylindrical inner revolvably mounted base guide member 23—1, may be equipped with screens similar to the screens 35 of Fig. 2, extending across the current paths of the plating bath and the vessel is so shaped and the anode aggregate is so positioned therein as to compensate for the resistive voltage drop of the plating current passing through the length of the tape base passing through the plating bath and secure substantially uniform current density of the plating current along the entire length of the base element immersed in the plating bath, notwithstanding the non-uniform potential distribution thereon.

As indicated in Fig. 2, each plating vessel may be provided with an inclined bottom wall for discharging a portion of its contents through a discharge outlet 42 having a discharge opening through which the impurities accumulating in the lowermost layer of the solution are continuously discharged into a collecting vessel 41 at a pre-set rate. The contents of the collecting vessel 41 are delivered by a duct line 44, including a pump 45, to a storage, purification and conditioning system 46. The purification and conditioning system may be of the type used in other commercial plating systems. It is provided with a section in which the solution returned from the collecting vessel 41 is filtered and purified and one or more sections in which there is added to the purified solution additional ingredients for restoring its desired composition and hydrogen ion concentration, whereupon the so purified and restored plating solution with a required admixture of fresh plating solution, heated to the desired temperature, is delivered by the purification and conditioning system to a supply duct 47 provided with branch ducts 48 for delivering to each of the plating vessels a predetermined quantity of the properly conditioned solution, each branch duct 48 being provided with a suitably controlled valve 49 for controlling the rate at which a purified and reconditioned plating solution is delivered to each plating vessel 21 in a quantity correlated to the quantity discharged therefrom.

A slurry of nickel or cobalt carbonates ($NiCo_3$, $CoCO_3$) or both is very effective in restoring the pH value of the plating solutions of the type described above since no impurities are introduced into the bath.

The desirable characteristics of the electroplated magnetic layer are improved by subjecting the plated surface of the tape 10 to a polishing action as it passes from the plating bath of one plating vessel 21 to the next bath. The guide bar 24 associated with each vessel may be used as polishing bars.

According to one phase of the invention, the magnetic and mechanical properties of an electroplated recording medium of the general type described above may be materially improved and electroplated magnetic layers which are very effective for magnetic recording may be obtained by carrying on the electroplating process by a succession of current pulses of opposite polarity so that successive current pulses of one polarity in the direction from the anode to the cathode are interspersed with current pulses of smaller magnitude in opposite direction.

When a source of commercially alternating current is available, such as a source of 60-cycle A. C. current, such plating process of the invention may be satisfactorily carried on by sending through the plating bath a direct current which is superimposed on an alternating current, so that the overall plating current has an alternating current component which is about two to four times greater than the direct current component.

When referring to electroplating processes carried on by a succession of current pulses in opposite direction or by superposition of direct current on alternating current, the terms "current" and "current density" designate the root means square value of the resulting current.

By carrying on the plating process of the invention described above at a temperature of about 70° C. with plating bath A maintained at a pH value of 5.0 and a current density of 100 amperes D. C. superposed on 200 amperes A. C. per square foot of the plating surface area, there is obtained an electroplated magnetic record track layer adherently united to the wire-like tape base of non-magnetic material having very desirable characteristics as a magnetic recording medium and in which the electroplated record layer exhibits a coercive force of about 200 oersteds and a remanence of about 10,000 gauss.

By carrying on such electroplating process of the invention with 100 amperes D. C. superposed on 350 amperes A. C. per square foot of plating surface area, the other conditions remaining unchanged, there is obtained such electroplated magnetic record layer exhibiting a coercive force of about 270 oersteds and a remanence of about 9,000 gauss.

With the same bath at 75° C., and 100 amperes D. C. superposed on 500 amperes A. C., there is obtained an electroplated magnetic record layer having a coercive force of about 300 oersteds and a remanence of about 8,000 gauss.

When carrying on such plating processes at a temperature of 25° C., with the plating bath maintained at a pH value of 3.0, and with 50 amperes D. C. superposed on 175 amperes A. C. per square foot of plating area, there is obtained a good magnetic record layer exhibiting a coercive force of about 200 oersteds and a remanence of about 9,000 gauss; an increase of the plating current density to 100 amperes D. C. superposed on 350 amperes A. C. per square foot of plating area gives an electroplated magnetic record layer exhibiting a coercive force of about 230 oersteds and about 7,000 gauss.

When such a plating process is carried on with a direct current component having superposed thereon an alternating current component having a root mean square (R. M. S.) value two to five times the value of the direct current component there results a succession of current pulses of opposite polarity and magnitude which causes the plating.

Such plating processes of the invention may also be carried on with such unequal opposite current pulses alternating at a rate other than the conventional rate of sixty cycles per second, as long as the rate of such alternating current pulses is in the range from about 20 cycles per minute up to ten thousand cycles and higher.

When carrying on the plating process of the invention with a plating bath A–3 maintained at a pH value of 4.5 with 150 amperes D. C. superposed on 525 amperes A. C. per square foot of plating area, there is obtained such electroplated magnetic record layer exhibiting a coercive force of about 275 oersteds and a remanence of about 8,000 gauss.

When carrying on such plating processes with a plating bath A–5 at a bath temperature of 25° C. and a pH value of 4.5 with 100 amperes D. C. superposed on 200 amperes A. C. per square foot plating area, there is obtained a base with an electroplated magnetic layer of desirable magnetic recording characteristics exhibiting a coercive force of about 160 oersteds and a remanence of about 7,000 gauss.

Instead of using chloride plating baths, sulphate plating baths may be used. The following is an example of a satisfactory sulphate plating bath for carrying on the process of the invention.

Plating bath B:

| | | |
|---|---|---|
| $CoSO_4.7H_2O$ | grams/litre | 235 |
| $NiSO_4.6H_2O$ | grams/litre | 110 |
| $NiCl_2.6H_2O$ | grams/litre | 110 |
| $H_3BO_3$ | grams/litre | 25 |

When electroplating a wire-like tape base of non-magnetic metal with such plating bath at a temperature of 68° C. while maintaining the pH value of the bath at 4.95 with 350 amperes D. C. superposed on 700 to 1150 amperes A. C. per square foot plating area, the tape base will be plated with a good magnetic record layer exhibiting desirable magnetic record characteristics and a coercive force of about 200 oersteds and a remanence of about 8,000 gauss. Nickel carbonate is very effective in maintaining the pH value of the plating solution.

According to the invention, electroplated thin, flexible, filamentary, round or magnetic recording media either in the form of a wire or a wire-like tape of desirable characteristics may be produced with a layer containing essentially only one ferro-magnetic metal, such as cobalt, nickel or iron. Thus, to make a wire-like tape with an electroplated magnetic layer composed essentially of cobalt having very desirable magnetic recording characteristics, the following plating bath solution may be satisfactorily used:

Plating bath C:

| | |
|---|---|
| $CoCl_2.6H_2O$ ____________grams/litre__ | 400 |
| $H_3BO_3$ ________________grams/litre__ | 25 |
| Balance water | |

When carrying on the plating process with such solution at a temperature of about 25° C. with the plating bath maintained at a pH value of 5.0 and plating with 100 amperes D. C. per square foot surface area, there is obtained a plated magnetic record layer of very desirable recording characteristics exhibiting a coercive force of about 100 oersteds and a remanence of about 9,000 gauss.

By carrying on such a plating process with 50 amperes D. C. superposed on 100 amperes A. C. per square foot plating surface area, the obtained desirable plated magnetic record layer exhibits a coercive force of about 130 oersteds and a remanence of about 8,000 gauss.

When carrying on such a plating process with a solution of the same composition maintained at a temperature of about 70° C. and a pH value of about 5.0 with a plating current of 100 amperes D. C. per square foot surface area, there is obtained a plated magnetic record track layer of the very desirable magnetic recording characteristics exhibiting a coercive force of about 100 oersteds and a remanence of about 8,000 gauss.

By carrying on the plating process under the same conditions with 100 amperes D. C. superposed on 250 amperes A. C. per square foot surface area, there is obtained an electroplated magnetic record track layer of very desirable magnetic recording characteristics exhibiting a coercive force of about 140 oersteds and a remanence of about 7,000 gauss.

In order to obtain an electroplated wire-like tape of the invention provided with a thin electroplated record layer composed essentially of nickel only, the following plating bath may be satisfactorily used:

Plating bath D:

| | |
|---|---|
| $NiCl_2.6H_2O$ ____________grams/litre__ | 400 |
| $H_3BO_3$ ________________grams/litre__ | 25 |

When carrying on the plating process with such plating bath at a temperature of about 70° C. and a pH value of 5.0 with 100 amperes D. C. superposed on 350 amperes A. C., there is obtained a non-magnetic wire-like tape base with an electroplated magnetic layer of very desirable magnetic recording characteristics and exhibiting a coercive force of about 100 oersteds and a remanence of about 5,000 gauss.

When plating with such bath at 70° C. and pH value of 5 and 10 to 20 amperes D. C. superposed on 35 and 70 amperes A. C. respectively, there is obtained an electroplated magnetic layer of nickel having desirable recording characteristics and exhibiting a coercive force of over 100 oersteds and a remanence of over 3,000 gauss.

A distinct valuable feature of the electroplated magnetic recording media of the invention is the fact that the obtained plated recording medium exhibits a tensile strength materially greater than the tensile strength of the base material. Thus, an unplated tape base of Phosphor bronze having a cross section of .014 x .002 inch, which breaks when subjected to a tensioning force of 3 lbs. 5 oz., will, when plated in accordance with the invention with a cobalt-nickel plating having a thickness of about .0003″, break only when subjected to the much greater force of 5 lbs. 7 oz.

The electroplated magnetic record layers produced by any one of the processes described above are improved by subjecting the plated surface of the base, as it proceeds from one bath to another, to a polishing action at intermediate stages of the plating process. Thus, when carrying on the electroplating process of the invention with a plating system of the type shown in Fig. 2, the plated surface of the tape is subjected to the polishing action of a polishing member held against the plated surface of the moving tape base as it passes from the plating bath of one plating vessel 21 to the next.

Thus, when using the system of Fig. 2, a polishing member in the form of an elongated polishing rod 24 is placed against the underside of a portion of the plated tape as its passes from one plating vessel 21 to the next plating vessel, the polishing rods being, for instance, placed between successive plating vessels. Brighteners, such as .2% para-amino benzene sulfonylamide may be added to the bath. A wetting agent, such as .4% of dioctyl sodium sulfo succinate (Aerosol) may be added.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described above.

I claim:

1. In the manufacture of a magnetic recording medium having an exposed layer of permanently magnetizable cobalt-nickel alloy material, the procedure of providing a core serving as cathode, and electrolytically depositing on the surface of the core a layer of magnetizable cobalt-nickel alloy from an aqueous solution comprising boric acid and material selected from the group consisting of nickel sulphate, nickel chloride, cobalt sulphate, cobalt chloride and mixtures thereof, the ratio of cobalt ion to nickel ion in the solution lying between 2.75/1.25 to 1.25/2.75; maintaining the solution at a pH falling within the range of 2 to 5.5 and at a total metal ion content of about 25 to 150 grams per litre; and passing through the solution a composite electrolyzing current comprising a direct current component and an alternating current component the R. M. S. value of the alternating current component being 2 to 5 times the value of the direct current component and the direct current density being between 20 and 300 amperes per square foot of exposed core surface, to produce a layer of magnetizable cobalt-nickel alloy having a coercive force of at least about 200 oersted.

2. In the manufacture of a magnetic recording medium having an exposed layer of permanently magnetizable cobalt, the procedure of providing a core serving as cathode, and electrolytically depositing on the surface of the core a layer of magnetizable cobalt from an aqueous solution comprising essentially boric acid and material selected from the group consisting of cobalt sulphate and cobalt chloride; maintaining the solution at a pH falling within the range of 2 to 5.5 and at a metal ion content of about 25 to 150 grams per litre; and passing through the solution a composite electrolyzing current comprising a direct current component and an alternating current component, the R. M. S. value of the alternating current component being 2 to 5 times the direct current component and the direct current density being between 20 and 300 amperes per square foot of exposed core surface, to produce a layer of magetizable cobalt having a coercive force of at least about 130 oersted.

PASCHAL P. ZAPPONI

REFERENCES CITED

The following references are of record in the file of this patent:

UNITED STATES PATENTS

| Number | Name | Date |
|---|---|---|
| 836,339 | Pedersen | Nov. 20, 1906 |
| 934,601 | Fuller | Sept. 21, 1909 |
| 1,074,424 | Fessenden | Sept. 30, 1913 |
| 1,800,947 | Mason | Apr. 14, 1931 |
| 2,041,480 | Oexmann | May 19, 1936 |
| 2,165,027 | Bitter | July 4, 1939 |
| 2,167,188 | Schaarwachter | July 25, 1939 |
| 2,190,667 | Kelsall | Feb. 20, 1940 |
| 2,293,229 | Walker | Aug. 18, 1942 |
| 2,316,303 | Wesley | Apr. 13, 1943 |
| 2,359,224 | Knoll | Sept. 26, 1944 |
| 2,443,599 | Chester | June 22, 1948 |
| 2,443,756 | Williams | June 22, 1948 |
| 2,515,192 | Chester | July 18, 1950 |

OTHER REFERENCES

"Metal Industry," Apr. 19, 1929, pages 396—398; Jan. 1944 pages 43, 44.

"Journal of Industrial & Engineering Chemistry," Sept. 1917, pages 841—844.

"Transactions of the Electrochemical Society," vol. 80 (1941), pages 579–583.

"Transactions of the Faraday Society," vol 24, part 6, June 1928, pages 348–358.